United States Patent [19]

Bonko

[11] Patent Number: 5,046,541
[45] Date of Patent: Sep. 10, 1991

[54] TRACTOR TIRE

[75] Inventor: Mark L. Bonko, Hartville, Ohio

[73] Assignee: The Goodyear Tire & Rubber Company, Akron, Ohio

[21] Appl. No.: 419,912

[22] Filed: Oct. 11, 1989

[51] Int. Cl.$^5$ ............................................. B60C 11/11
[52] U.S. Cl. ............................. 152/209 B; 152/209 R
[58] Field of Search ..................... 152/209 R, 209 B; D12/140, 146, 147, 149, 151

[56] References Cited

U.S. PATENT DOCUMENTS

| | | | |
|---|---|---|---|
| D. 99,605 | 5/1936 | Reel | D12/140 |
| D. 169,668 | 2/1952 | Hardeman . | |
| D. 255,674 | 7/1980 | Menin | D12/147 |
| D. 256,008 | 7/1980 | Menin | D12/147 |
| D. 303,365 | 9/1989 | Bonko | D12/151 |
| D. 303,366 | 9/1989 | Bonko | D12/151 |
| D. 303,367 | 9/1989 | Bonko et al. | D12/151 |
| D. 303,779 | 10/1989 | Bonko | D12/151 |
| 3,237,669 | 4/1964 | Travers | 152/209 B |
| 3,603,370 | 9/1971 | Hylbert . | |
| 4,131,148 | 12/1978 | Bertazzoli et al. | 152/209 B |
| 4,383,567 | 5/1983 | Crum et al. | 152/209 B |
| 4,480,672 | 11/1984 | Marshall et al. | 152/209 B |
| 4,534,392 | 8/1985 | Bonko et al. | 152/209 B |
| 4,574,857 | 3/1986 | Beeghly et al. | 152/209 B |
| 4,711,283 | 12/1987 | Bonko et al. | 152/209 B |
| 4,727,917 | 3/1988 | Stewart | 152/209 B |
| 4,791,971 | 12/1988 | Shinn | 152/209 B |

FOREIGN PATENT DOCUMENTS 1548533 12/1968 France .
1284847 1/1987 U.S.S.R. .
1591139 6/1981 United Kingdom .

OTHER PUBLICATIONS

1980 Tread Design Guide, p. 211, Kelly-Spring.; Grader Trac, 2nd row down from top.
1982 Tread Design Guide, p. 205, Star Grader, bottom rt. corner "Operating Instruc. for Michelin Tires 84/85" p. 187, XF & Dumper (Trans).
"Michelin Tires For Enginering Implements" 76-77, p. 22 XF.

*Primary Examiner*—Michael W. Ball
*Assistant Examiner*—Mark A. Osele
*Attorney, Agent, or Firm*—David L. King; R. J. Slattery, III

[57] ABSTRACT

A tire for tractors and other off-the-road vehicles which exhibits good traction, vibration and cleaning characteristics. The tire has a tread with two sets of primary lugs (34, 38) sets of secondary lugs (70, 72). The one set of primary lugs (34) are spaced about the tread (32) and extend from the first lateral tread edge (36) to an inner end which does not extend beyond the equatorial plane (EP). The other set of primary lugs (38) extend from the second lateral edge (40) and are opposite in hand to the first set of primary lugs. The first and second sets of secondary lugs are spaced from the first and second lateral edges respectively with the second set (72) being opposite in hand to the first set (70) of secondary lugs. Each lug of the first set of secondary lugs is located between a pair of primary lugs of the first set as are each lug of the second set of secondary lugs of the second set located between a pair of primary lugs of the second set.

32 Claims, 9 Drawing Sheets

TRACTOR TIRE

BACKGROUND OF THE INVENTION

This invention relates to pneumatic tractor tires for use on farm tractors and other like vehicles.

More particularly this invention relates to farm tires that exhibit good traction characteristics while also having good cleaning, ie. soil, mud etc. removal, while also exhibiting good vibration characteristics.

Tractor tires and other farm vehicles are being used more and more on the road as farmers drive their equipment from one field to another. Some tires may exhibit good vibration characteristics while operated off the road while exhibiting poor vibration characteristics while operated on the road, and vice versa. Typically, with the advent of large corporate or family farms coupled with the increasing size of the tractors, tractors are used more and more on the road to transport them to and from one field or another. Therefore, it has become more important to provide a tire which has good vibration characteristics both on the road and off the road. However, it is important at the same time to maintain good traction or draw bar characteristics while also providing for the removal of the soil, mud, etc.

It has been generally recognized that improvements in ride vibration characteristics for a tractor on the road would produce a less desirable traction characteristic. A tractor tire in accordance with one embodiment of this invention has resulted in a tire having improved vibration characteristics over U.S. Pat. No. 4,534,392, known in the industry as having good vibration characteristics, while also having good traction characteristics and improved tread cleaning characteristics.

It is further noted that tires according to at least one embodiment herein exhibit good tractive efficiency. Tractive efficiency being how efficient the traction is when compared to fuel consumption. For example, if under identical conditions, soil, tractor, weight, etc., two different sets of tires have the same draw bar traction, but the tractor used less fuel during the same test with the first set than with the second set, then the first set has a higher traction efficiency than the other.

SUMMARY OF THE INVENTION

It therefore is an object of the invention to provide a farm or agricultural tire which has good vibration characteristic both on and off the road.

It is also an object of the invention to provide a tractor tire which includes both good traction and good vibration characteristics.

It is a feature of this invention that the tread of the tire has two sets of primary lugs and two sets of secondary lugs. The secondary lugs being axially offset from the axial edge.

It is an advantage of this invention that off-the-road tires or agricultural tires exhibit good on the road vibration characteristics.

It is also an advantage of this invention that the off-the-road or agricultural tires exhibit good on the road ride and handling characteristics.

It is still further an advantage of this invention that the tires have good tractive efficiency.

These and other objects, features, and advantages can be accomplished by a tire having an equatorial centerplane and a tread portion having a pair of lateral edges, the tread portion comprising: a) two sets of primary lugs, the first set of primary lugs spaced circumferentially about the tread of the tire extending from the first lateral edge of the tread, the second set of primary lugs spaced circumferentially about the tread of the tire extending from the second lateral edge of the tread, each of the second set of primary lugs being similar to the first set of primary lugs but opposite in hand and wherein a footprint of the tire each lug of the first and second set of primary lugs has a surface area wherein at least 90% of the surface area lies within a first polygon, of the parallelogram type, having a first radial end, parallel to the respective lateral edge of the tread and a second radial end axially inner from and parallel to the first radial end and located between 25% and 45% of the tread width of the tread portion from the first radial end and first and second axial sides diametrically opposed a distance "N" and parallel to one another, wherein the distance "N" is from 5% to 11% of the tread width of the tire, the first axial side extending from a leading edge of the first radial end to a leading edge of the second radial end and the second axial side extending from a trailing edge of the first radial end to a trailing edge of the second radial end and wherein the axial sides form an angle with respect to a line parallel to the equatorial centerplane of the tire in the range from 45 to 60 degrees; and b) two sets of secondary lugs, the lugs of the first set of secondary lugs disposed circumferentially between the lugs of the first set of primary lugs, the lugs of the second set of secondary lugs disposed circumferentially between the lugs of the second set of primary lugs and being similar to the first set of secondary lugs but opposite in hand, and wherein a footprint of the tire each lug of the first and second sets of secondary lugs has a surface area wherein 85% to 100% of the surface area lies within a second polygon having a first side parallel to the equatorial centerplane of the tire and located an axial distance from the nearest tread edge of between 19% to 32% of the tread width of the tire, a second side having a first and second end, the first end of the second side attached to a trailing end of the first side and extending therefrom at an inclination with respect to a line parallel to the equatorial centerplane of the tire in the range from 45 degrees to 60 degrees, a third side extending from the second end of the second side to an end located an axial distance from the tread edge from 47% to 57% of the tread width, the second and the third sides forming an angle therebetween in the range from 158 degrees to 168 degrees: a fourth side extending perpendicularly from the end of the third side a distance, "D1", of from 5% to 11% of the tread width, a fifth side parallel to the second side separated therefrom the perpendicular distance D1, and extending from a leading edge of the first side to a sixth side, the sixth side being parallel to the third side and extending from the fifth side to a leading edge of the fourth side.

These and other objects, features, and advantages can be further accomplished by a tire having a radial ply carcass and a tread disposed radially outwardly of the radial carcass and the tread portion comprising: a tread disposed radially outwardly of the radial carcass and belt structure and the tread portion comprising:

(a) two sets of primary lugs, the first set of primary lugs spaced circumferentially about the tread of the tire, and extending from a first lateral edge of the tire, the second set of primary lugs spaced circumferentially about the tread of the tire and extending from a second lateral edge of the tire, the lugs of the first set of primary lugs being of a first configuration and the lugs of the second set of primary lugs being similar to, but opposite in hand to, the lugs of the first set of primary lugs, and each lug of the first set of primary lugs being circumferentially offset from an axially adjacent lug of the second set of primary lugs; and (b) two sets of secondary lugs, each lug of the first set of secondary lugs disposed between a pair of lugs of the first set of primary lugs and extending axially from a first end spaced a predetermined distance from the first lateral edge of the tire to a second end spaced circumferentially from an axially inner end of an axially adjacent primary lug of the second set of primary lugs a distance at least equal to the width of the respective secondary lug, each lug of the second set of secondary lugs disposed between a pair of lugs of the second set of primary lugs and extending axially from a first end spaced a predetermined distance from the second lateral edge of the tire to a second end spaced circumferentially from an axially inner end of an axially adjacent primary lug of the first set of primary lugs a distance at least equal to the width of either the primary lug or the respective secondary lug, the lugs of the first set of secondary lugs having a configuration different from the primary lugs and similar to but opposite in hand from the lugs of the second set of secondary lugs.

DESCRIPTION OF THE DRAWINGS

The following is a brief description of the drawings in which like parts may bear like reference numerals and in which.

DEFINITION

The following definitions are applicable to this specification, including the claims, wherein:

"Aspect ratio" of the tire means the ratio of its section height (SH) to its section width (SW) multiplied by 100% for expression as a percentage.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Design rim" means a rim having a specified configuration and width.

"Design rim width" is normally the specific commercially available rim width assigned to each tire size and typically is between 80% and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Leading" refers to a portion or part of the tread that contacts the ground first, with respect to a series of such parts or portions, during rotation of the tire in the preferred direction.

"Net-to-gross ratio" means the ratio of the tire tread rubber that makes contact with the road surface while in the footprint, divided by the area of the tread in the footprint, including non-contacting portions such as grooves.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" are used to mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum inner distance parallel to the axis of the tire and between the exterior of its sidewalls when and after it has been inflated at normal pressure for 24 hours, but unloaded excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference load.

"Trailing" refers to a portion or part of the tread that contacts the ground last, with respect to a series of such parts or portions during rotation of the tire in the preferred direction.

"Tread width" means the arc length of the tread surface in the axial direction, that is, in a plane passing through the axis of rotation of the tire.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subjected to any load.

"Unit tread pressure" means the radial load borne per unit area (square centimeter or square inch) of the tread surface when that area is in the footprint and the tire is loaded.

DETAIL DESCRIPTION OF THE INVENTION

Figure 1:
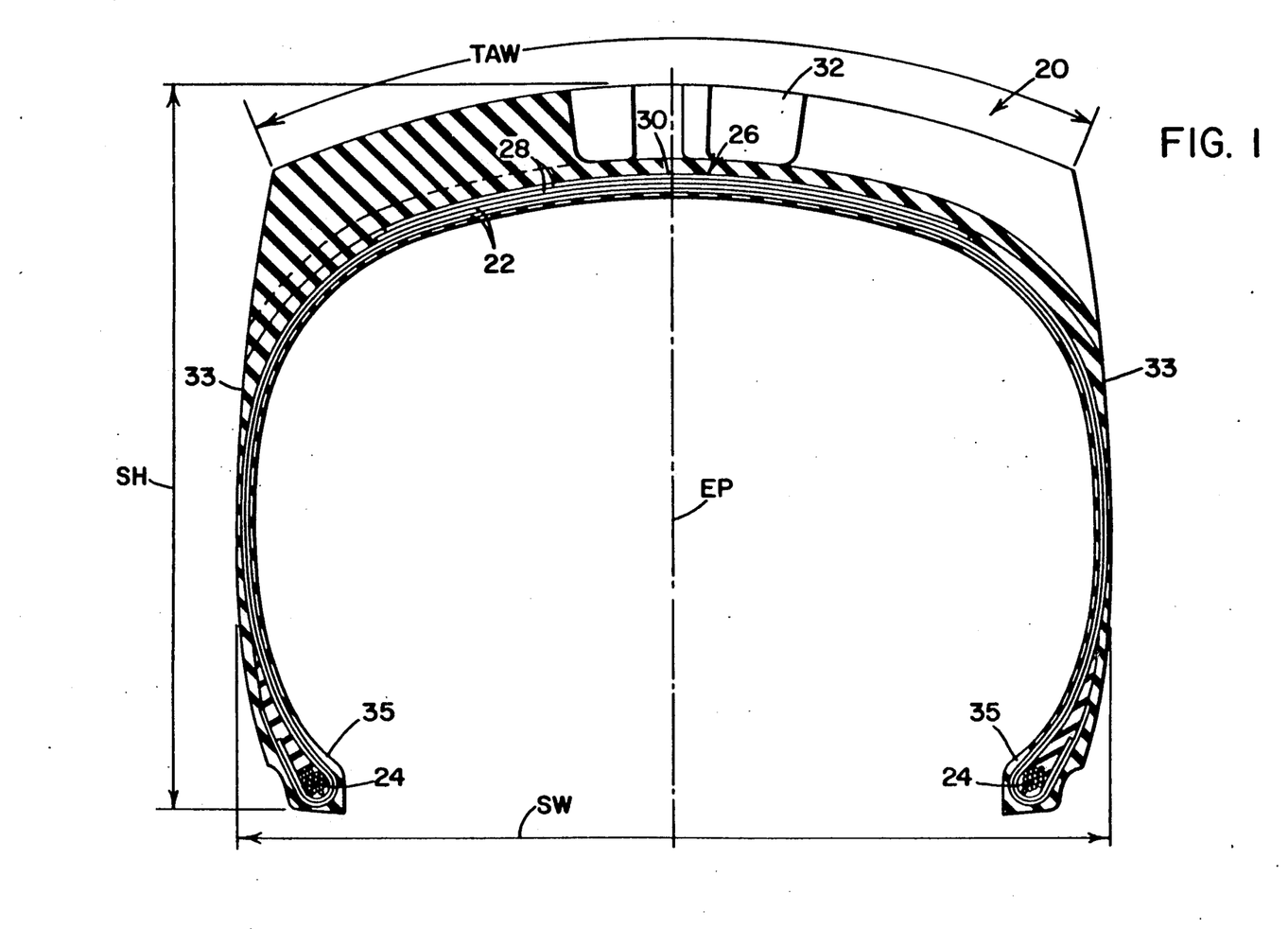
FIG. 1 is a cross-section of a tire of FIG. 2, taken substantially along line 1—1.

Now referring to FIG. 1 a tire, shown generally as reference numeral 20 is preferably a radial-ply, pneumatic tire having one or more carcass plies 22 extending circumferentially about the axis of rotation of the tire and are anchored around a pair of substantially inextensible annular beads 24. A belt reinforcing structure 26 comprising one or more belt plies 28 are disposed radially outward from the carcass plies for reinforcing the crown region 30 of the tire. A circumferentially extending tread portion 32 is located radially outwardly of the belt reinforcing structure 26. A sidewall portion 33 extends radially inwardly from each axial or lateral edge of the tread portion to an annular bead portion 35 having the beads 24 located therein.

A tire according to the invention furthermore has a tread arc width TAW in the range of 80% to 100% of the maximum cross-sectional width SW of the tire. The relationship between the maximum cross-sectional width and the tread arc width of a tire according to the invention is believed to be important because it contributes to the ride and handling characteristics of the tire.

Figure 2:
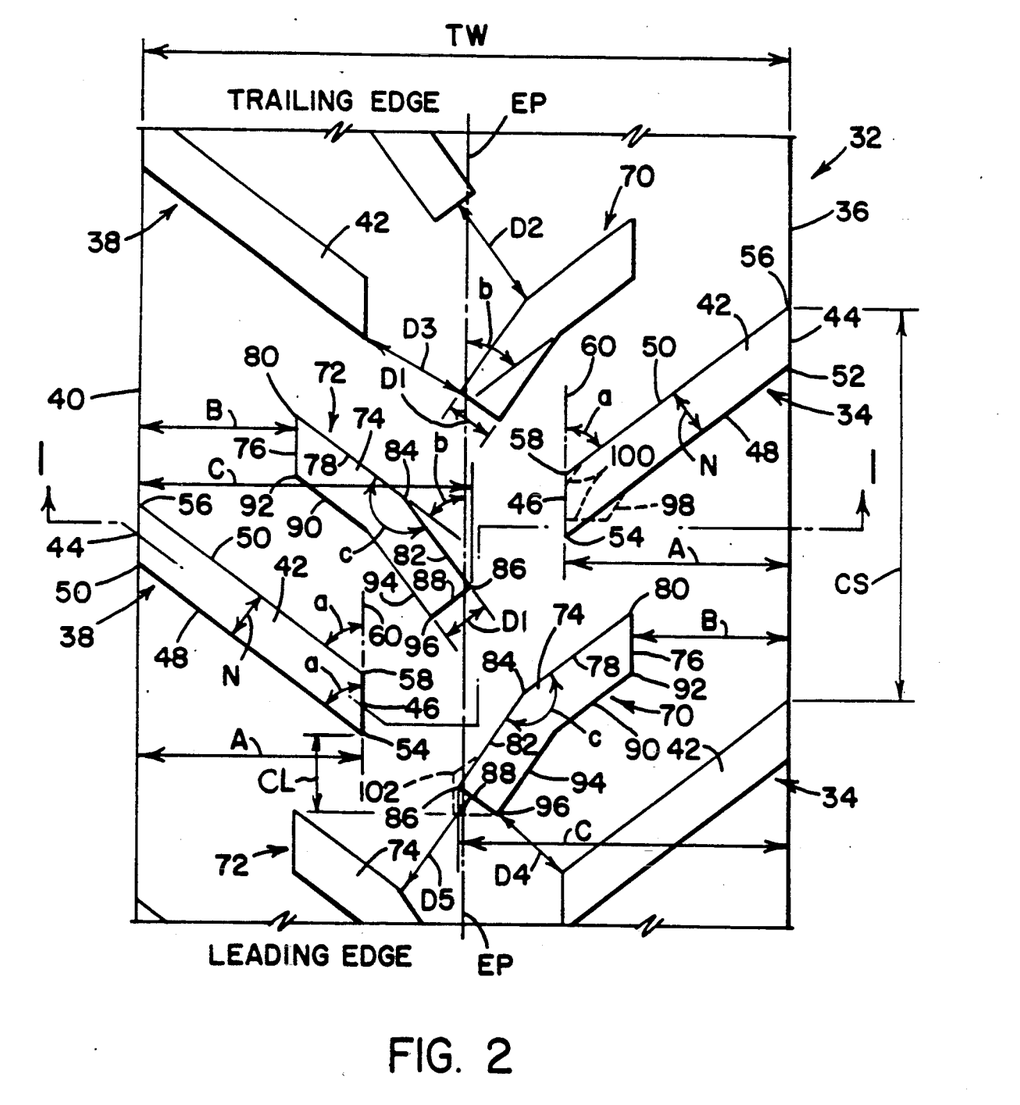
FIG. 2 is a fragmentary view of a tread portion of a tire according to one embodiment of the invention.

The tread portion 32 of the tire 20, referring to FIG. 2, has two sets of primary lugs and two sets of secondary lugs disposed about the tread of the tire. The lugs 34 of the first set of primary lugs are spaced circumferentially about the tread of the tire and extend from the first lateral edge 36 of the tread 32 while the lugs 38 of the second set of primary lugs are spaced circumferentially about the tread of the tire and extends from the second lateral edge 40 of the tread 32. Each of the lugs of the second set of primary lugs are similar to the lugs of the first set of primary lugs, but are opposite in hand. While primary lugs extend from a lateral edge of the tread, secondary lugs are spaced a predetermined distance from the lateral edge.

In a footprint of the tire, each lug of the first and second set of primary lugs has a radially outer tread surface area, ie. a road contacting area, wherein at least 90% of the lug surface area lies within a polygon 42, of a first set of polygons of the parallelogram type. The polygons 42 each have a first end 44 which is parallel to and extending from the respective lateral edge 36, 40 of the tread and a second end 46, axially inner from and parallel to the first end 44. The second end 46 is located a distance "A" from said first radial end as measured perpendicularly to the respective lateral edge 36, 40, from between 25% and 45% of the tread width TW of the tread and preferable between 30% and 40% of the tread width of the tread. Put another way the distance "A" is measured along one edge of a plane which has its other edge as the axis of rotation of the tire. In the preferred embodiment the distance "A" will be constant for each polygon of the first set of polygons.

Each first polygon 42 has first 48 and second 50 axial sides diametrically opposed to one another a distance N and parallel to one another. The distance or width "N", measured perpendicularly to the first and second axial sides is from about 5% to about 11% of the tread width TW of the tire. It is believed that the width of the lugs should not be less than 5% of the tread width or the lug may have a tendency to fold over and not be stable under load. Often an agricultural tire, which is designed primarily for off-the-road use, must be driven on paved road surfaces. In such cases, only the radially outer tread surface of the lugs contacts the road surface. Therefore, the primary and secondary lugs must have sufficient width and strength to support the vehicle.

The first axial side 48 extends from a leading edge 52 of said first end 44 to a leading edge 54 of the second end 46. The second axial side 50 extends from a trailing edge 56 of the first end 44 to a trailing edge 58 of the second end 46. The axial sides 48, 50 each form an angle "a" with respect to the equatorial plane of the tire or a line 60 parallel to the equatorial centerplane EP of the tire in the range from 45 to 60 degrees.

The lugs 70 of the first set of secondary lugs are disposed circumferentially between the lugs 34 of the first set of primary lugs while the lugs 72 of the second set of secondary lugs are disposed circumferentially between the lugs 38 of the second set of primary lugs and are similar to the first set of secondary lugs but opposite in hand.

In a footprint of the tire, each lug of the first and second set of secondary lugs has a radially outer tread surface area, ie a road contacting area, wherein at least 85% of the lug surface area lies within a polygon of a second polygon type 74, and wherein preferably at least 90% of the lug surface area is within the second type of polygons. The second polygons 74 each have a first side 76 parallel to the equatorial centerplane EP of the tire and located an axial distance "B" from the nearest tread edge 36,40 of between 19% to 32% of the tread width TW of the tire. A second side 78 is attached at one end 80 to a trailing end of said first side 76 and extends therefrom at an inclination "b" with respect to the equatorial plane or a line parallel to the equatorial centerplane of the tire in the range from 45 degrees to 60 degrees. A third side 82 extends from the other end 84 of the second side 78 to an end 86 located an axial distance "C" from the respective tread edge 36, 40 in the range from 47% to 57% of the tread width TW. In the preferred embodiment the distance "C" will be constant for each polygon of the second polygon type. The second 78 and the third 82 sides form an angle "c" there between in the range from about 158 degrees to about 168 degrees. A fourth side 88 extends perpendicularly from the end 86 of the third side 82 a distance, D1, of from 5% to 11% of the tread width TW. A fifth side 90 is parallel to the second side 78, separated therefrom a perpendicular distance D1 and extends from a leading edge 92 of the first side 78 to a sixth side 94. The sixth side is parallel to the third side 82 and extends from the fifth side 90 to a leading edge 96 of said fourth side 88.

The ratio of the length of the second side 78 of the second polygon to the length of the third side 82 may be in the range from about 0.9 to about 1.5 and preferably from about 1.0 to 1.4. The ratio of the length of the second side 78 of the second polygon 70 to the length of the second axial side 50 of the first polygon 42 is in the range from about 0.16 to about 0.76 and preferably from 0.26 to 0.66.

Preferably the inclination "b" of the second side 78 of the second polygon is equal to the angle "a" of the axial sides 48, 50 of the first polygon. In other words the second side of the second polygon would be parallel with the axial sides of the first polygon with respect for each tread edge.

It is also preferred that the end 86 of the second polygons 74 are located a greater distance from the tread edge than the second radial end of the first polygons 42. In other words the distance "C" is greater than the distance "A".

The lugs of the first and second sets of primary lugs can have any particular shape as long as at least 90% of their surface area is located within one of the first polygons. In other words, if a polygon of the first type 42 as described above can be located over a lug of the first or second set of primary lugs in the footprint of a tire and at least 90% of the lugs surface area must be within this polygon. This means that the lug may extend beyond the boundaries of the polygon, for example as illustrated by dashed portion 98 and/or it may not completely include the entire portion of the polygon, for example as illustrated by dashed portions 100. As a result the primary lugs may have different shaped lug heads provided that the lug has 90% of its surface area within the confines of the polygon. In like manner the leading and trailing edges could be straight, a series of straight segments, curved, etc so long as 90% of the total surface area is within the polygon.

In like manner the lugs of the first and second sets of secondary lugs can have any particular shape as long as at least 85% of their surface area is within the second polygons. For example, the head of the lug 102 may extend beyond the sides or boundaries of the polygons. The leading and trailing edges of the lugs of the secondary sets of lugs may comprise a straight line segment, or segments, a curved segment or segments, etc.

It is preferred that each lug of the first and second sets 70,72 of the secondary lugs is located axially from a primary lug 34,36. In other words an axial line (ie perpendicular to the equatorial plane EP) should be able to be passed through at least one portion of the secondary lug that will also pass through at least one portion of an adjacent primary lug. However, it is further preferred that as the tire is rotated the secondary lug and the adjacent primary lug do not strike the footprint at the same time. In other words the leading portions of the lugs are not in axial alignment but rather are circumferentially offset. Circumferentially spacing the ends of adjacent primary and secondary lugs allows each lug to penetrate the soil at a different time. This helps in traction while reducing noise and vibrations during on-the-road use. The circumferential spacing CL may be at least equal to the width of either the primary or the respective secondary lug, but is preferred to be the width of the secondary lug. It is still more preferred that the circumferential spacing CL be at least 1.5-2.0 times the lug width of the secondary lug. The circumferential spacing CL is the circumferential distance CL., ie. the distance measured along the equatorial plane EP or a line parallel thereto, from the leading most portion 54 of the second end 46 to the leading most portion 96 of the axially inner end of the adjacent secondary lug.

Each lug of the second set of primary lugs is offset circumferentially with respect to the adjacent lugs of the first set of primary lugs. In other words the lugs of the first set of primary lugs are not symmetrical with the second set of primary lugs about the equatorial plane EP.

Furthermore the leading edges of each lug of the first set of secondary lugs may be located axially and circumferentially from the trailing edge of the adjacent lug of the first set of primary lugs. The leading edge of each lug of the second set of secondary lugs may be located axially and circumferentially from a trailing edge of an adjacent lug of the second set of primary lugs.

The leading and trailing edges of the primary lugs are the edges of such lugs located adjacent to the first (leading) axial side 48 and second (trailing) axial side 50, respectively, of the first polygons 42. Similarly, the leading and trailing edges of the secondary lugs are the edges of such lugs located adjacent to the fifth 90 and sixth 94 sides (leading) and the first 78 and second 82 sides (trailing) respectively, of the second polygons 74.

It is believed to be very important for radial agricultural or off the road tires that the primary and secondary lugs have different shapes or configurations from one another. This prevents the tire from acting like a gear that can produce disturbing or unacceptable vibrations within the vehicle. Tires which have all their lugs extending from the tread edge, such as the primary lugs, are difficult to maintain low vibration levels. However, the use of the secondary lugs, which do not extend to the tread edge, are beneficial to balance the different harmonics produced.

The circumferential spacing CS between the leading edge of one primary lug and the leading edge of the next adjacent traction lug of the same set (ie. first or second) is within the range of 50% to 70% of the tread width and preferably from 54% to 66%.

Each lug is spaced apart from another lug, either primary or secondary, a distance D2, D3, D4, D5 of at least 12% of the tread width TW and preferably a distance of 12% to 15% of the tread width TW. This is important in order to allow for the free flow and removal of mud and other soil conditions.

In normal operation, the lugs, both primary and secondary, cut into the loose ground surface and provide a means for axial traction and lateral stability while the inner tread surface, the area between the protruding tread lugs, which usually contacts the ground surface, provides flotation and supports the weight of the vehicle. In a tire designed for a more conventional highway application, the area of the inner tread surface between the protruding tread lugs is not meant to contact the road surface The secondary lugs are not to be confused with block elements. Block elements are self-contained geometric shapes which provide additional surface area but are not primarily intended to penetrate and cut into the loose ground surface as are lugs. Block elements will be in close proximity with a primary lug which further hinder their ability to penetrate the soil. Furthermore, the length of a secondary lug is at least equal to 75% of the length of the primary lugs. Block elements, on the other hand have a length which is less than 75% of the length of the primary lugs. The length of the lugs and the block elements is the distance measured from one end to the other taken along the line established for the general angular inclination. This line contains the midpoint of the length of the axially outermost edge of the lug or block element and the axially innermost point of the leading edge of the lug or block element. This is explained further below. Block elements are further used normally in shallow nonskid tires. That is in tires having a nonskid level of less than 100. The nonskid, being the height of the lug block element to the inner tread surface as measured by any of the common means known in the art. The level 100 means the recommended height of the lugs as set forth in the Engineering Design Information standard of the U.S. Tire & Rim Association. Any greater or lesser depth would be indicated as a percentage of this standard. For example a height which would be 90% of this level would be a 90 non skid.

In accordance with a preferred embodiment of the invention (refer to FIGS. 3 and 4) a pneumatic tire 150 has a radial ply carcass, a belt reinforcing structure extending circumferentially about the axis or rotation of the tire, and a tread portion 152 located radially outwardly of the carcass and belt structure.

Figure 3:
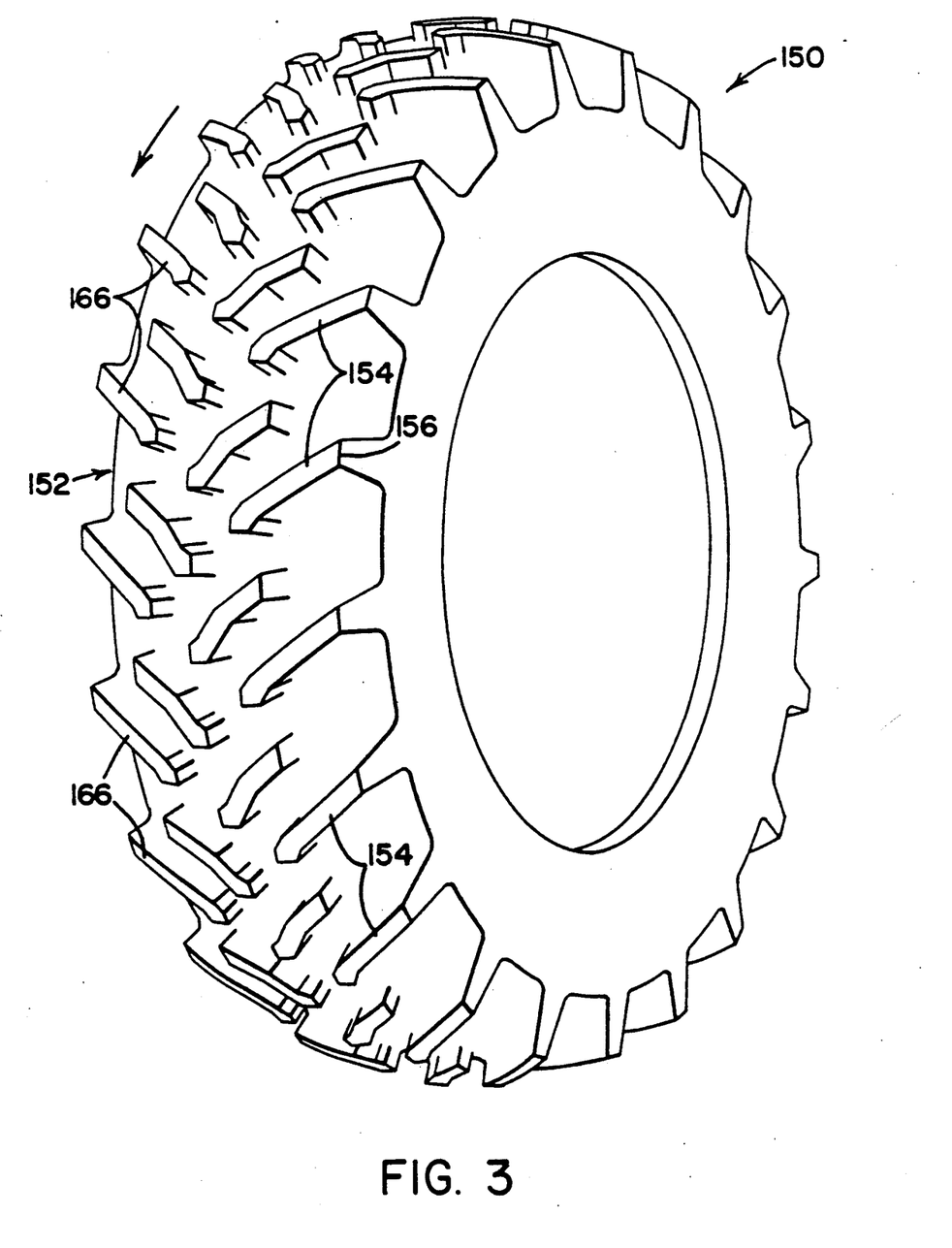
FIG. 3 is a perspective elevational view of a pneumatic tire according to one embodiment of the invention.

It should be noted that the tire according to this invention has a directional tread, and that there is a normal or preferred direction of rotation of such tire, as indicated by the arrow of FIG. 3, for the best overall performance thereof.

Figure 4:
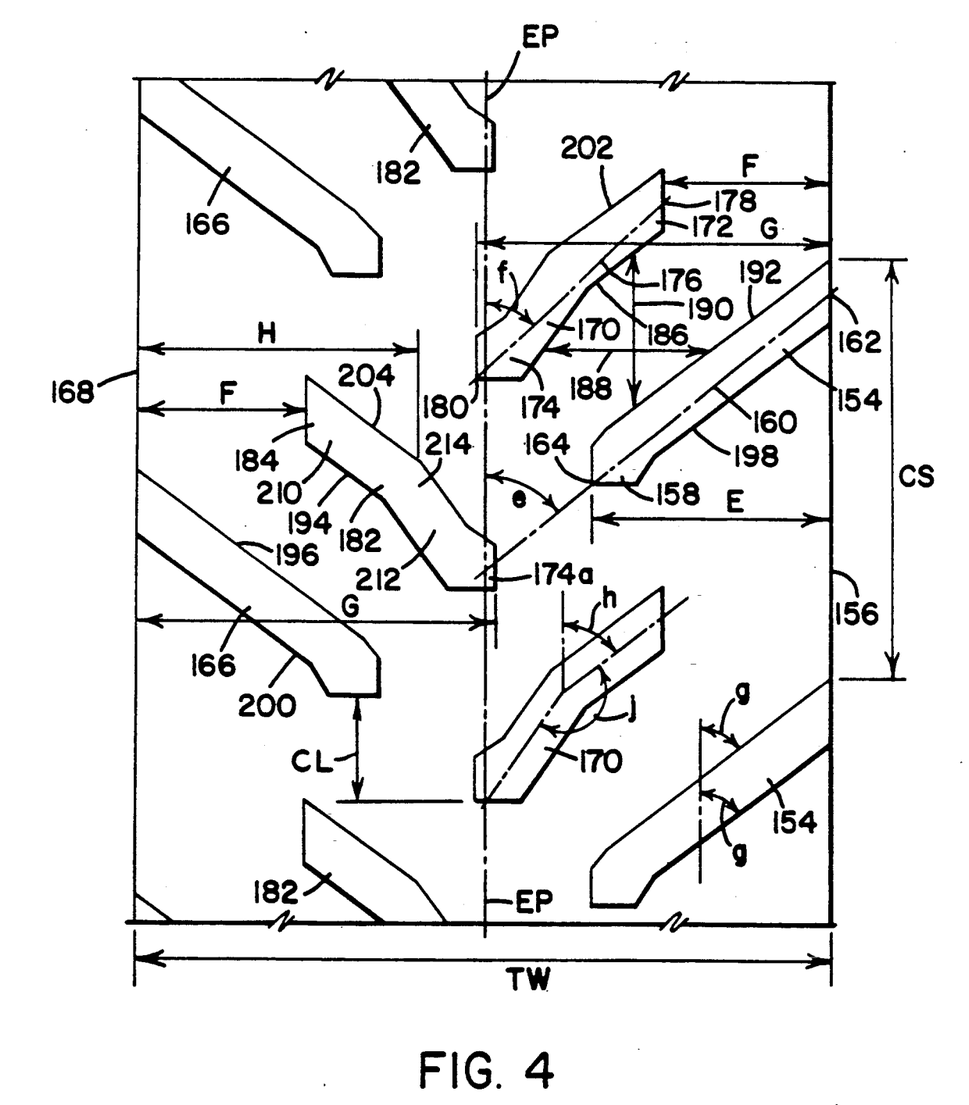
FIG. 4 is a fragmentary view of a tread portion of a tire according to the embodiment of FIG. 3.

The tread portion has a first set of primary lugs 154 spaced circumferentially about the tread of the tire. Each lug 154 of the first set of primary lugs extends from the first lateral edge 156 of the tread at an inclination "e" in the range from 45° to 60° with respect to the equatorial centerplane EP of the tire to an axially inner end 158 located an axial distance "E" of between 25% to 45% of the tread width of the tire and preferably between 30% and 40% of the tread width of the tire.

The angle "e" of general inclinations of the primary lug is determined by establishing a line 160 connecting the midpoint 162 of the length of the axially outermost edge of the lug 154 (which preferably is at the tread edge) with the axially innermost point 164 of the leading edge of the lug, and then measuring the inclination of this line 160 with respect to the equatorial plane EP or a line parallel thereto. It being understood that the inclination "e" and the axial distance "E", and all other measurements relating to the lugs and traction elements of the invention herein are measurements and inclinations made from a footprint of a tire.

The tread portion is further provided with a second set of primary lugs 166 spaced circumferentially about the tread of the tire. Each lug 166 of the second set of primary lugs extends from the second lateral edge 168 of the tread and is similar to, but opposite in hand, to the lugs 154 of the first set of primary lugs. The lugs 166 of the second set of primary lugs are offset circumferentially from adjacent pair of lugs 154 of the first set of primary lugs. The tread is further provided with a first set of secondary lugs 170 disposed circumferentially between the lugs of the first set of primary lugs 154. Each lug of the first set of secondary lugs has a first end 172 located an axial distance "F" from the first lateral tread edge between 19% to 29% of the tread width TW of the tire. Preferably the distance "F" is substantially constant for each secondary lug and that it is less than the distance "E" of the primary lug. In other words the first end 172 should circumferentially overlap with a portion of the primary lug. A second end 174 located an axial distance "G" from the first lateral tread edge of between 47% to 57% of the tread width of the tire. It is preferred that the second end 174 extends to or beyond the equatorial plane EP. In other words it is preferred that the axial distance "G" is between 51% to 57% of the TW. The lugs of the first set of secondary lugs extends from the first end 172 to the second end 174 at an inclination "f" in the range from 39 degrees to 54 degrees with respect to the equatorial centerplane of the tire. The angle "f" of inclination is determined by establishing a line 176 connecting the midpoint 178 of the length of the axially outermost edge of the lug 170 with the axially inner most point 180 of the leading edge of the lug, and then measuring the inclination of this line 176 with respect to the equatorial plane EP or a line parallel thereto.

A second set of secondary lugs 182 are disposed circumferentially between the lugs 166 of the second set of primary lugs. Each lug 182 of said second set of secondary lugs has a first end 184 located the axial distance "F" from the second tread edge and is similar to, but opposite in hand, to the lugs 170 of the first set of secondary lugs.

The lugs 170, 182 of the first and second sets of secondary lugs are located axially from a primary lug 154, 166 such that an axial line can pass through at least one portion of both the secondary lug 170, 182 and the adjacent primary lug 154, 166. Preferably the leading edge 186 of a lug 170 of the first set of secondary lugs is located both axially, line 188 and circumferentially line 190, from the trailing edge 192 of the adjacent lug 154 of the first set of primary lugs. Similarly, the leading edge 194 of a lug 182 of the second set of secondary lugs is located both axially and radially from the trailing edge 196 of the adjacent lug 166 of the second set of primary lugs.

The circumferential spacing CS between the leading edge 198, 200 of one primary lug 154, 166 and the leading edge of the next adjacent traction lug of the same set (i.e. first or second) is within the range of 50% to 70% of the tread width and preferably from 54% to 66%.

The preferred circumferential spacing CL between axially adjacent primary and secondary lugs is from 1.5 to 2.5 times the axial width of the lugs when both the primary and secondary lugs have substantially the same width, and in which it is more preferred to be about two times the axial width.

While it is preferred that the leading and trailing edges of the primary and secondary lugs are a series of straight line segments placed end to end in angular relationships, for example as illustrated in FIG. 4, it is understood to be within the scope of the invention to have the leading edges 198, 200, 186, 194 and the trailing edges 192, 196, 202, 204 of the lugs 154, 166, 170, 182, respectively to comprise only a single straight edge, single curve, or a series of curves.

It is preferred that the leading 198, 200 and trailing 192, 196 edges of the primary lugs 154, 166 be parallel to one another over at least 65% and preferably at least 75% of the overall length of the lug, as measured along the line 160 from the midpoint 162 of the length of the axially outermost edge to the axially innermost point 164 of the leading edge. As such, the parallel portions of the leading 198, 200 and trailing 192, 196 edges may have an inclination "g" with respect to the equatorial centerplane or a line parallel thereto in the range from 45° to 60°.

It should be noted that if polygons of the first set or type of polygons 42 were to be placed over the primary lugs 154, 166, each lug would have at least 90% of its surface area enclosed therein. In like manner at least 85% of the secondary lugs 170, 182 would be located within the polygons of the second polygon type 74.

The lugs of the first and second sets of secondary lugs may further comprise two portions 210, 212. The first portion extends from the first end 172, 184 to an axially inner end 214 of said first portion 172, 184 located a distance "H" between 35% to 45% of the tread width. The second portion extends from the axially inner end of the first portion to the second end 174, 174a.

The leading and trailing edges of the first portion of the lugs of the first and second sets of secondary lugs may be parallel for at least 65% of its length as measured along the leading edge of the first portion and the leading and trailing edges of the second portion of the lugs of the first and second sets of secondary lugs may be parallel for at least 65% of its length as measured along the leading edge of the second portion.

A centerline located midway between the parallel portion of the leading and trailing edges of the first portion of each lug of said first and second secondary sets of lugs forms an angle "h" with a line parallel to the equatorial centerplane of the tire in the range of 45 degrees to 60 degrees. Another centerline, located midway between the parallel portion of the leading and trailing edges of the second portion of each lug of said first and second secondary sets of lugs, forms an included angle "j" with the centerline of the first portion in the range of 158 to 168 degrees.

Figure 5:
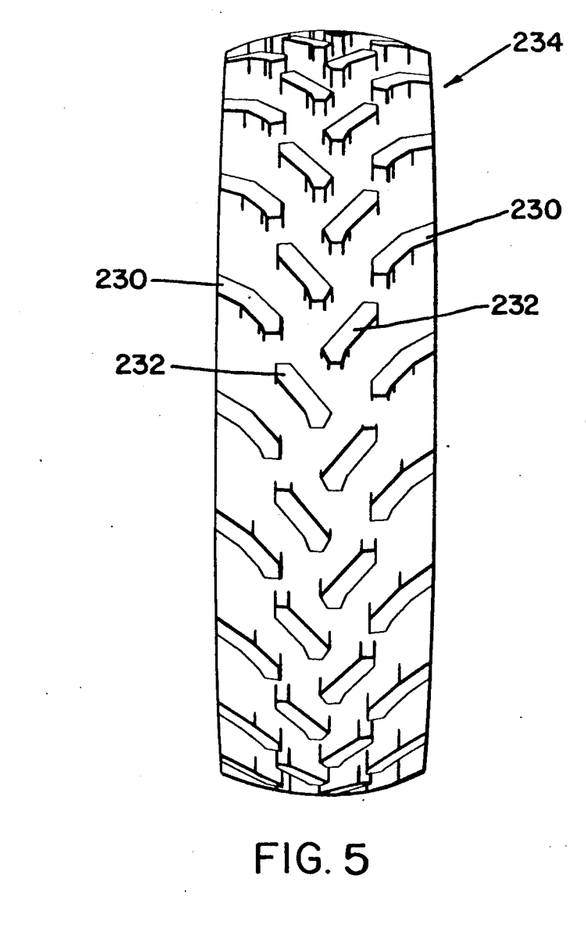
FIG. 5 is a front elevational view of a pneumatic tire incorporating a tread according to another embodiment.
Figure 6:
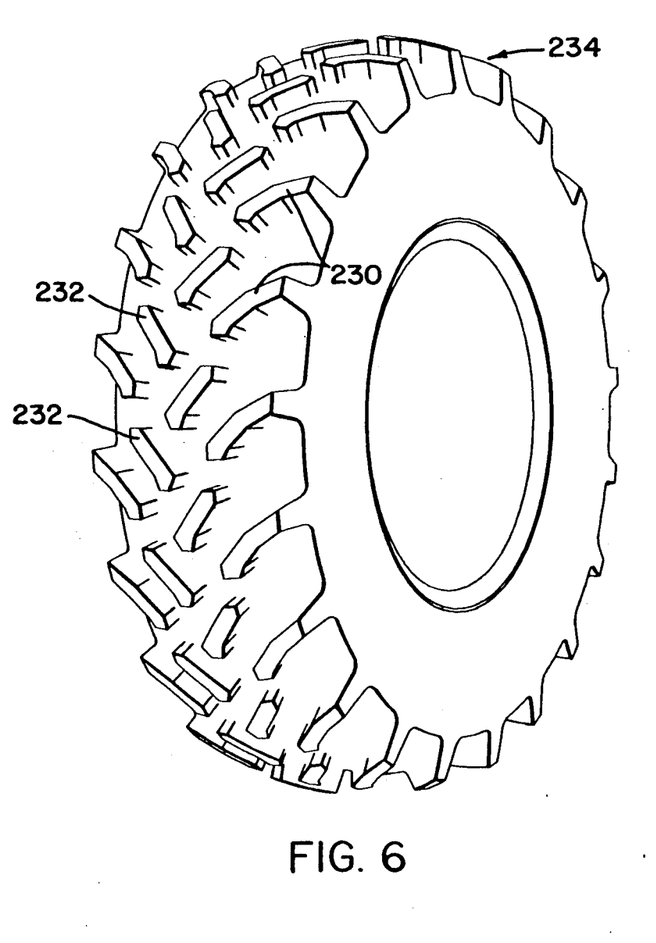
FIG. 6 is a perspective elevational view of a pneumatic tire according to FIG. 5.

In accordance with another embodiment of the invention (referring to FIGS. 5, 6, and 7) the primary 230 and secondary 232 lugs of a tread of a tire 234 may have a configuration which is similar to that of the primary and secondary lugs respectively of the previous embodiment.

Figure 7:
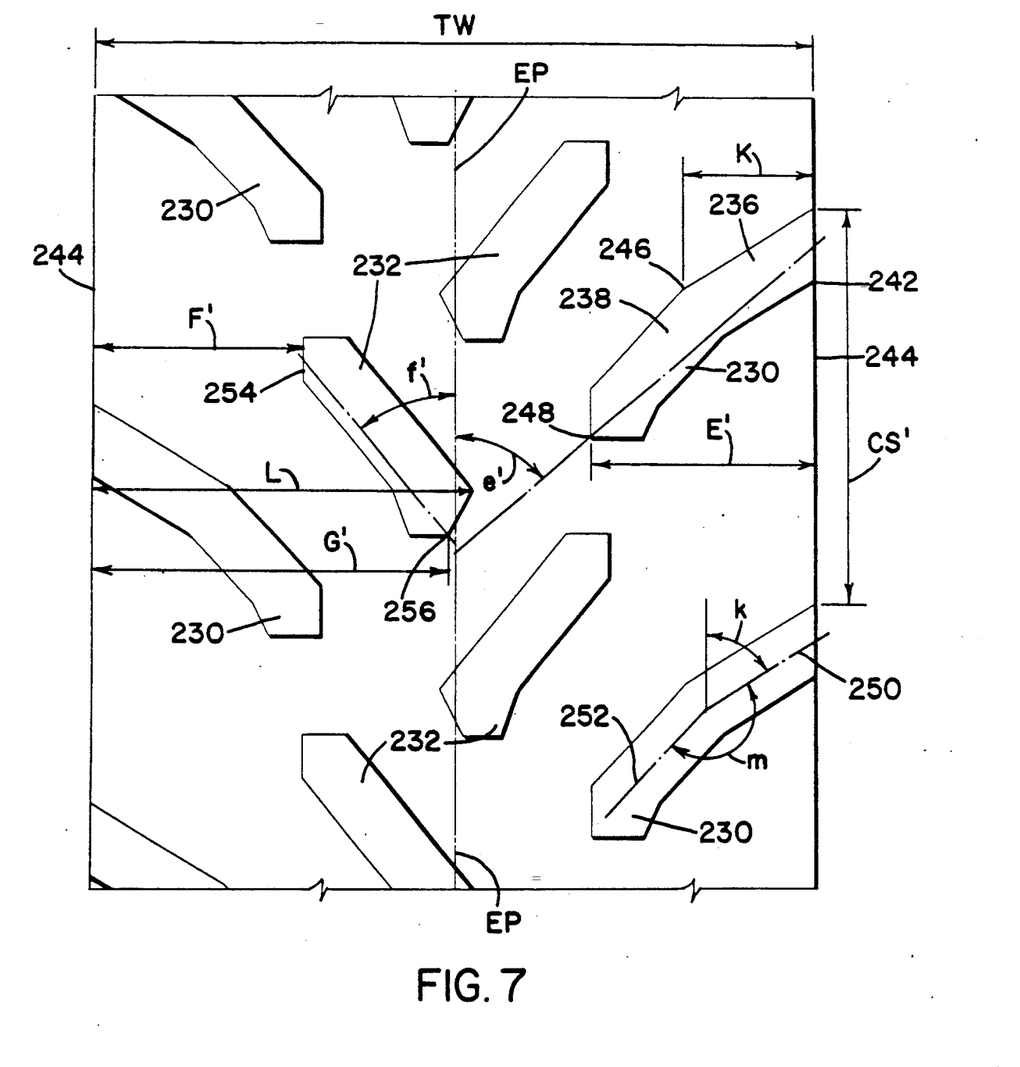
FIG. 7 is a fragmentary view of a tread of the tire according to the embodiment of FIGS. 5 and 6.

For example, the secondary lugs 232 may have a substantially straight configuration while the primary 230 lugs may have two different portions 236, 238. The first portion 236 may extend from a first end 242 of the lug adjacent to a tread edge 244 to an axially inner end 246 of the first portion 236 located a distance K between 15% to 22% of the tread width. The second portion 238 extends from the axially inner end 246 of the first portion 236 axially inwardly. Each primary lug extends from the respective lateral edge 244 of the tread at an inclination e' of about 50° and preferably in the range from 45° to 60° with respect to the equatorial centerplane EP of the tire to an axially inner end 248 located an axial distance E' of between 25% to 45% of the tread width of the tire and preferably between 25% and 35% of the tread width of the tire 234.

A centerline 250 located midway between and parallel to the leading and trailing edges of the first portion of the primary lugs forms an angle k with the equatorial centerplane or a line parallel thereto in the range of 45 degrees to 60 degrees. Another centerline 252, located midway between the parallel portion of the leading and trailing edges of the second portion of each lug of the primary lugs, forms an included angle "m" with the centerline of the first portion in the range of 158 to 168 degrees.

Each secondary lug 232 has a first end 254 located an axial distance F' from a respective lateral tread edge 244 between 25% to 32% of the tread width TW of the tire. A second end 256 is located an axial distance G' from the respective lateral tread edge 244 of between 47% to 53% of the tread width TW of the tire. It is preferred that a portion of the lug 232 extends to or beyond the equatorial plane EP preferably an axial distance L in the range of 51% to 57% of the TW. The secondary lugs extend from the first end 254 to the second end 256 at a general inclination f' in the range from 39 degrees to 54 degrees with respect to the equatorial centerplane of the tire.

The circumferential spacing CS' between the leading edge of one primary lug 230 and the leading edge of the next adjacent primary lug is within the range of 50% to 70% of the tread width and preferably from 54% to 66%.

While although the above tread can be used with tires having 100% non-skid depth it is believed that this tread design can be used fairly well with treads having a non-skid of about 90%. This will therefore provide a tire which will have both good traction and vibration characteristics that can be used with the smaller no frills tractors, commonly known as "bid" tractors.

It is preferred that the lugs, both primary and secondary are braced by sidewalls having two different angular inclinations with respect to a radial plane when viewed in cross-section. The lugs and/or such bracing is described in copending U.S. application Ser. No. 07/419,878 filed concurrently herewith by M. L. Bonko and L. C. Lopp the disclosure of which is hereby incorporated by reference.

Figure 8:
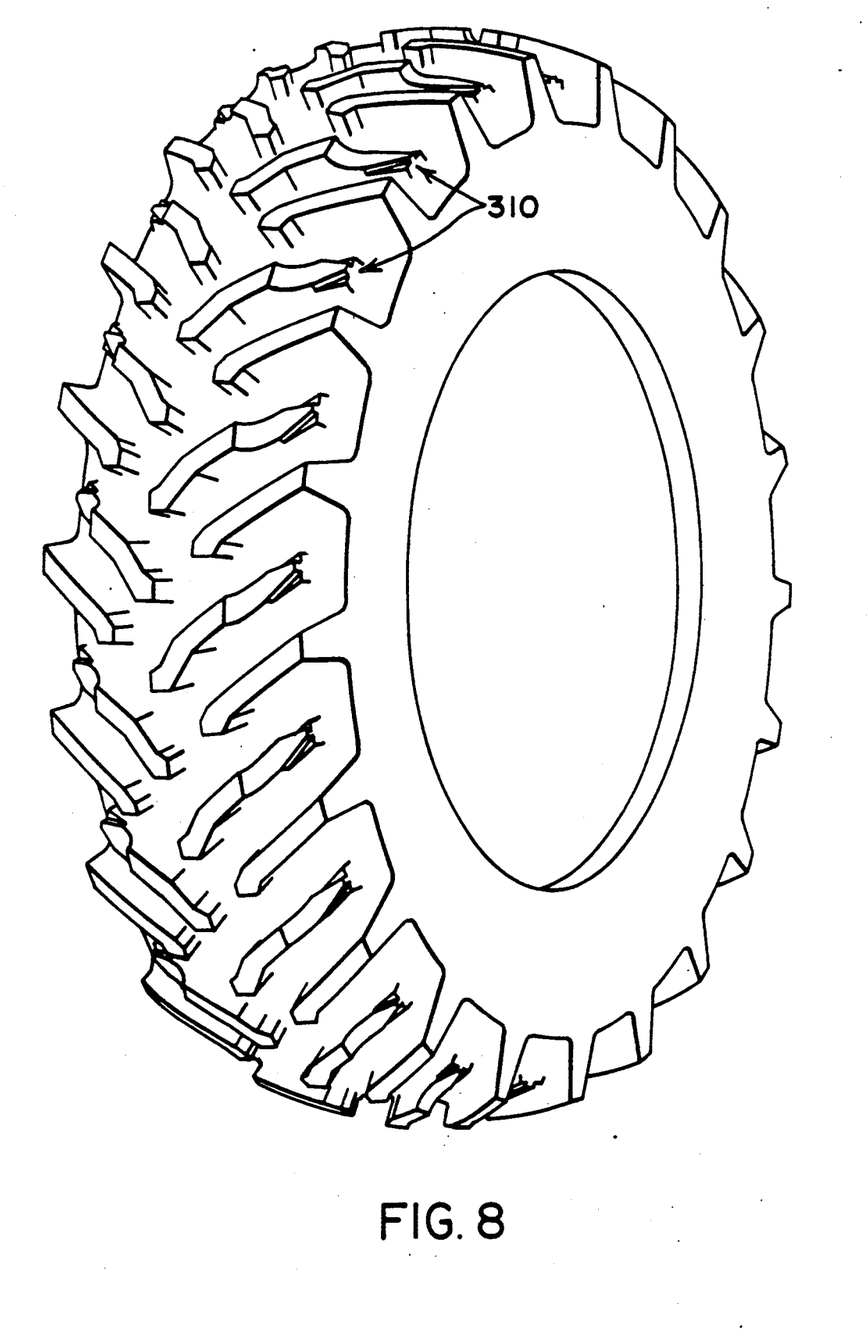
FIG. 8 is a perspective elevational view of a pneumatic tire according to one embodiment of the invention and used in conjunction with a mud ejector.

Refer now to FIG. 8. In a more preferred embodiment, the invention as described herein is used on a tread of a tire 300 in conjunction with a mud ejection lug or system shown generally at reference numeral 310. The mud ejection lug or system is described in copending U.S. application Ser. No. 07/419,879 filed concurrently herewith by M. L. Bonko and L. C. Lopp, the disclosure of which is hereby incorporated by as a reference.

EXPERIMENT

An experiment was conducted to compare the vibration characteristics of a tire according to FIGS. 3 and 4 with that of a control tire according to U.S. Pat. No. 4,534,392 known as The Goodyear Dyna Torque Radial which is known to have good vibration characteristics. The experiment included both measured data and subjective data.

The measured data was gathered by three accelerometers mounted on a John Deere F-49 JD4240 tractor. One accelerometer was mounted on the axle, one on the cab floor and one on the cab roof. Each accelerometer sensed the acceleration in G forces along a different axis. The data gathered by the cab roof and floor accelerometers is believed to be very important because they relate to what a driver perceives and feels, respectively while driving the tractor. The axial data, although gathered is believed to be of a lesser importance.

The rear tires of the tractor were locked with respect to each other and the vehicle speed was stepped from 0.5 mph to 19.5 mph in 0.5 mph increments. Significant accelerations including amplitude and frequency, at any of the above vehicle speeds were then measured by the accelerometers for a particular orientation of tread lugs between the rear tires. Depending upon the number of different tread elements there are a number of different tread lug orientations (also referred to as phase angles) between the two rear tires. The tire according to FIGS. 3 and 4 has four different phase combinations, the primary lug of one tire and the following lug of the opposite tire: 1) primary lug, but opposite in hand thereto: 2) secondary lug of the same hand: 3) primary lug, of the same hand; 4) secondary lug, but opposite in hand thereto. In like manner the control tire has six different phases or combinations.

Figure 9A:
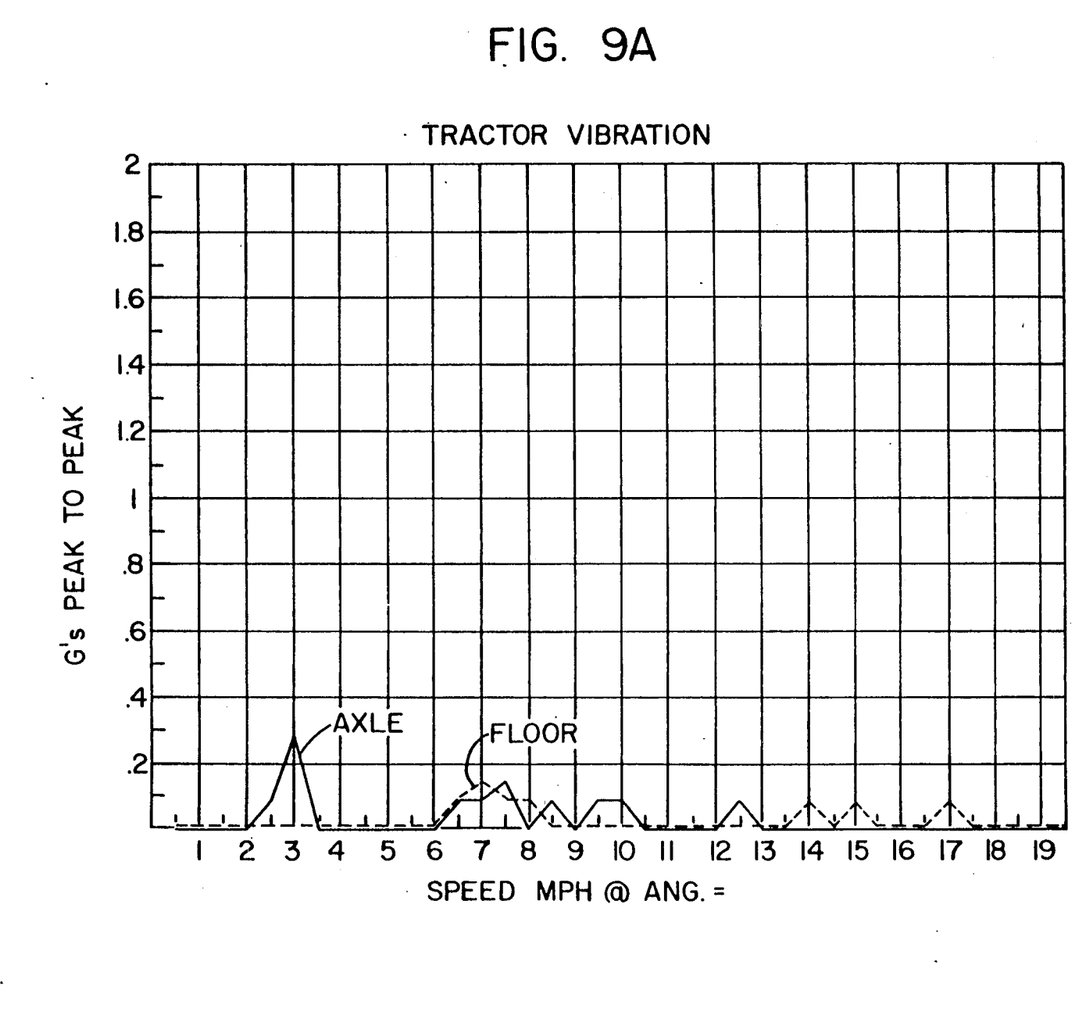
FIGS. 9A and 9B are a graph of the maximum vibration recorded at the axle, floor and roof of a tractor during a test of a control tire and a tire according to one embodiment of the invention.
Figure 9B:
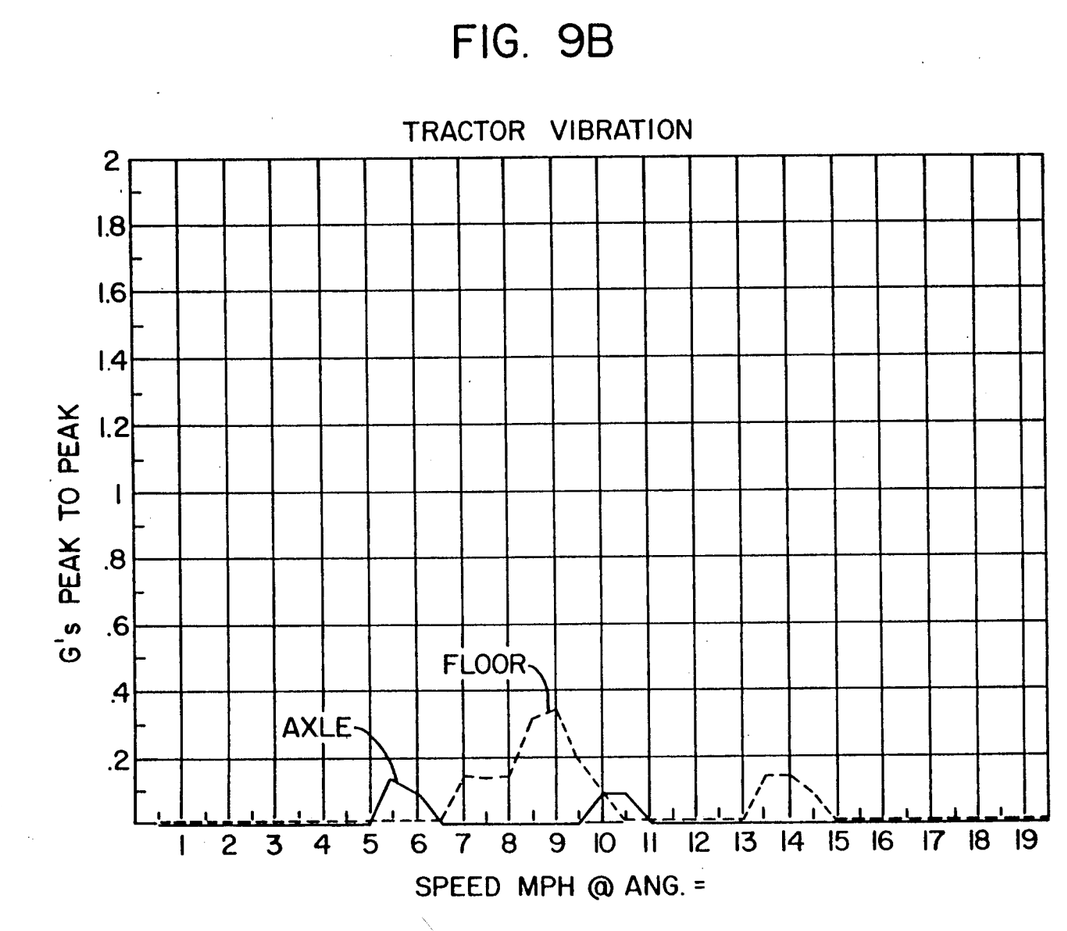

At each combination of vehicle speed and tire phase angle, all three vibrations were resolved into a series of superimposed sine curves by means of a Fourier transform. The amplitudes and frequencies of these equivalent sine curves were then tabulated and plotted against the vehicle speed for each accelerometer location for each tire construction at each phase angle. For convenience the results of only Phase 1 has been plotted for the test tire, FIG. 9A and the control tire, FIG. 9B.

The data of Table 1 represents the largest accelerations recorded for each tire at each different phase combination. The control tire had a width of 21.06 inches, an OD of 71.97 inches, a SLR of 33.72, 60 lugs and was inflated to 18 PSI.

The test tire had a width of 21.13 inches, an OD of 72.08 inches a SLR of 33.80, 84 lugs and was inflated to 18 PSI.

TABLE 1

| | CONTROL TIRE | | | TEST TIRE | | |
|---|---|---|---|---|---|---|
| PHASE | LOCATION | "G" LEVEL | FREQ | PHASE | "G" LEVEL | FREQ |
| 1 | AXLE | .13 | 45.0 | 1 | .28 | 10.5 |
|   | FLOOR | .34 | 22.5 |   | .14 | 24.0 |
|   | ROOF | * | * |   | .08 | 1.5 |
| 2 | AXLE | .08 | 43.5 | 2 | .08 | 33.0 |
|   | FLOOR | .14 | 25.5 |   | .08 | 25.5 |
|   | ROOF | .34 | 9.0 |   | .08 | 1.5 |
| 3 | AXLE | .08 | 45.0 | 3 | .08 | 3.0 |
|   | FLOOR | .14 | 25.5 | * | * |  |
|   | ROOF | .14 | 4.5 |   | .08 | 1.5 |
| 4 | AXLE | .14 | 43.5 | 4 | .08 | 40.5 |
|   | FLOOR | .14 | 22.5 |   | * | * |
|   | ROOF | .28 | 4.5 |   | .08 | 1.5 |
| 5 | AXLE | .31 | 9.0 |  |  |  |
|   | FLOOR | .28 | 22.5 |  |  |  |
|   | ROOF | .37 | 9.0 |  |  |  |
| 6 | AXLE | .08 | 31.5 |  |  |  |
|   | FLOOR | .14 | 21.0 |  |  |  |
|   | ROOF | .08 | 9.0 |  |  |  |

*DATA TOO SMALL

The amplitude of the accelerations, ie. vibrations of the test tire are generally as low or lower than those of the associated control tire. This was further confirmed by subjective testing. The subjective testing was performed by unlocking the differential of the tractor and driving it in a series of S-curves. This had the effect of sweeping through all the phases of the tire lug combinations. A subjective rating on a scale of 1–10, with 10 being the highest, and best rating was then recorded for different speed ranges as shown in Table 2.

TABLE 2

| TIRE | 0–5 MPH | 5–10 MPH | 10–15 MPH | 15–20 MPH |
|---|---|---|---|---|
| CONTROL | 6.0 | 6.0 | 6.0 | 6.0 |
| TEST | 6.5 | 6.0 | 6.0 | 6.5 |

While certain representative embodiments and details have been shown for the purpose of illustrating the invention, it will be apparent to those skilled in this art that various changes and modifications may be made therein without departing from the scope of the invention.

It is claimed:

1. A tire having an equatorial centerplane and a tread having first and second lateral edges defining the width of the tread, the tread comprising:

(a) two sets of primary lugs, the first set of primary lugs being spaced circumferentially about the tread of the tire and extending from the first lateral edge of the tread, the second set of primary lugs being spaced circumferentially about the tread of the tire and extending from the second lateral edge of the tread, each of the second set of primary lugs being similar to the first set of primary lugs but opposite in hand, in a footprint of the tire each lug of the first and second set of the primary lugs having a surface area at least 90% of which lies within a parallelogram having a first side parallel to the respective lateral edge of the tread and a second side positioned axially inwardly from and parallel to the first side, the second side being located between 25% and 45% of the tread width from the first side, both first and second sides having leading and trailing edges, the parallelogram having third and fourth parallel sides spaced perpendicularly a distance N, the distance N being from 5% to 11% of the tread width, the third side extending from the leading edge of the first side to the leading edge of the second side and the fourth side extending from the trailing edge of the first side to the trailing edge of the second side, the third and fourth sides both forming angles with respect to the equatorial centerplane of the tire in the range from 45 to 60 degrees;

(b) two sets of secondary lugs, the lugs of the first set of secondary lugs being disposed circumferentially between the lugs of the first set of primary lugs, the secondary lug having a first end disposed from the first lateral edge axially inwardly a distance in the range of 19% to 32% of the tread width, the lugs of the second set of secondary lugs being disposed circumferentially between the lugs of the second set of primary lugs and axially inwardly from the second lateral edge a distance in the range of 19% to 32% of tread width and being similar to the first set but opposite in hand, in a footprint of the tire each lug of the first and second sets of secondary lugs having a surface area 85 to 100% of which lies within a six-sided polygon having a first side having a leading and trailing ends, the first side being parallel to the equatorial centerplane of the tire and located an axial distance from the nearest tread edge of between 19% to 32% of the tread width, the polygon having a second side having first and second ends, the first end of the second side being attached to the trailing end of the first side and extending from the first side at an inclination with respect to the equatorial centerplane of the tire in the range of 45 to 60 degrees, the polygon having a third side having first and second ends, the third side having its first end at the second ends, the third side and the third side having its second end of the second side and the third side having its second end located an axial distance from the tread edge from 47% to 57% of the tread width, and extending from the second side at an inclination with respect to the equatorial plane less than the inclination of the second side, the second and third sides having an angle formed between them in the range of 158 to 168 degrees, the polygon having a fourth side extending perpendicularly from the second end of the third side a distance D1, of from 5% to 11% of the tread width, the fourth side having leading and trailing ends, the polygon having a fifth side parallel to the second side and separated from the second side the perpendicular distance D1, the fifth side having first and second ends, the first end being connected to the leading end of the first side, and the polygon having a sixth side extending between the second end of the fifth side and the leading end of the fourth side.

2. The tire according to claim 1 wherein the inclination of the second side of the six-sided polygon is equal to the angle formed by the third side of the parallelogram with respect to a line parallel to the equatorial centerplane of the tire.

3. The tire according to claim 1 wherein the ratio of the length of the second side of the six-sided polygon to the length of the third side of the six-sided polygon is in the range from 0.9:1 to 1.5:1.

4. The tire according to claim 3 wherein the ratio of the length of the second side of the six sided polygon to the length of the second axial side of the parallelogram is in the range from 0.16:1 to 0.76:1.

5. The tire according to claim 2 or 4 wherein each lug of said second set of primary lugs is offset circumferentially with respect to the next adjacent pair of lugs of the first set of primary lugs and each lug of said first and second sets of secondary lugs is disposed axially from a primary lug.

6. The tire according to claim 1 wherein each lug of said first set of secondary lugs has a leading edge disposed axially and circumferentially from a trailing edge of an adjacent lug of said first set of primary lugs; and each lug of said second set of secondary lugs has a leading edge disposed axially and circumferentially from a trailing edge of an adjacent lug of the second set of primary lugs.

7. The tire of claim 6 wherein the lugs of the primary sets of lugs further have a trailing edge; and said leading and trailing edges are straight.

8. The tire of claim 6 wherein the lugs of the primary sets of lugs further having a trailing edge; and said leading edge and trailing edges are curved.

9. The tire of claim 7 wherein the lugs of the secondary sets further have a trailing edge; and the leading and trailing edges comprising a series of straight line segments.

10. The tire of claim 8 wherein the lugs of the secondary sets of lugs further have a trailing edge and the leading and trailing edges comprising series of curved segments.

11. The tire of claim 1 wherein the circumferential spacing between a leading edge of a primary lug of one set and a leading edge of the next adjacent primary lug of the same set is within the range of 50% to 70% of the tread width and that each lug is diagonally spaced apart from another lug a distance of at least 12% to about 15% of the tread width.

12. A tire according to claim 1 wherein each primary lug has leading and trailing edges which are curved.

13. The tire of claim 1 wherein the primary and secondary lugs have different configurations.

14. A tire having an equatorial centerplane, a radial ply carcass, and a tread disposed radially outwardly of the carcass, the tread having first and second lateral edges defining the width of the tread, the tread comprising:

(a) two sets of primary lugs, the first set of primary lugs being spaced circumferentially about the tread and extending generally axially inwardly an axial distance in the range of 25% to 45% of the tread width from the first lateral edge to an axially inner end of the lug, the second set of primary lugs being spaced circumferentially about the tread and extending generally axially inwardly from the second lateral edge an axial distance in the range of 25% to 45% of the tread width to an axially inner end, the lugs of the second set being similar to, but opposite in hand to the lugs of the first set of primary lugs, and each lug of the first set of primary lugs being circumferentially offset from an axially adjacent lug of the second set of primary lugs; and (b) two sets of secondary lugs, each lug of the first set of secondary lugs having first and second ends, being disposed between a pair of lugs of the first set of primary lugs, and extending generally inwardly from the first end, the first end being spaced at a distance in the range of 19% to 32% of the tread width from the first lateral edge, to the second end axially spaced a distance 47% to 57% of the tread width from the first lateral edge and spaced circumferentially from an axially inner end of an axially adjacent primary lug of the second set a distance of at least 5% of tread width, the first end circumferentially overlapping a portion of circumferentially adjacent primary lugs of the first set a distance measured axially not greater than 26% of the tread width, each lug of the second set of secondary lugs having first end second ends, being disposed between a pair of lugs of the second set of primary lugs, and extending generally axially inwardly from the first end, the first end being spaced a distance in the range of 19% to 32% of the tread width from the second lateral edge to the second end axially spaced a distance of 47% to 57% of the tread width from the second lateral edge and spaced circumferentially from an axially inner end of an axially adjacent primary lug of the first set a distance of at least 5% of the tread width, the first end circumferentially overlapping a portion of the circumferentially adjacent primary lugs of the second set a distance measured axially onto greater than 26% of the tread width.

15. The tire according to claim 14 wherein:
each primary lug extends from an axially outermost edge located at the respective lateral edge of the tread at an inclination in the range from 45 degrees to 60 degrees with respect to the equatorial centerplane of the tire to the axially inner end located an axial distance of between 25% to 45% of the tread width of the tire the inclination being determined by establishing a line connecting mid point of the axially outermost edge and the axially inner end and measuring the angle between the line and the equatorial centerplane;

the first end of the secondary lugs being located an axial distance from the respective lateral tread edge of between 19% to 32% of the tread width of the tire and the second end located an axial distance from the respective lateral tread edge between 47% to 57% of the tread width of the tire, and having an inclination in the range from 39 degrees to 54 degrees with respect to the equatorial centerplane of the tire the inclination being determined by establishing a line connecting midpoint of the first end, an axially innermost end of the second ends and measuring the angle between the line and the equatorial centerplane, and wherein each lug of the first and the second sets of secondary lugs is disposed axially from a primary lug.

16. The tire according to claim 15 wherein:

each lug of the first and the second sets of primary and secondary lugs have a leading and a trailing edge;

each lug of the first set of secondary lugs has the leading edge disposed both axially and circumferentially from the trailing edge of one of the adjacent lugs of the first set of primary lugs; and each lug of the second set of secondary lugs has the leading edge disposed both axially and circumferentially from the trailing edge of one of the adjacent lugs of the second set of primary lugs.

17. The tire according to claim 15 wherein said primary and said secondary lugs have leading edges which are curved.

18. The tire according to claim 15 wherein said primary and said secondary lugs have leading and trailing edges which are straight.

19. The tire according to claim 15, wherein said primary and said secondary lugs have leading and trailing edges which are a series of straight line segments.

20. The tire according to claim 15, wherein said tire has a tread arc width that is in the range of 80% to 100% of the maximum cross-sectional width of the tire.

21. The tire of claim 14 wherein each primary lug of the first and second sets of primary lugs comprises a first portion extending from the respective tread edge to an inner end of the first portion a distance of between 15% to 22% of the tread width and a second portion extending from the first portion to the axially inner end of said lug; and wherein the second end of each secondary lug of the first and second sets of secondary lugs is between 47% and 53% of the tread width and a portion of the secondary lug is located farther from the respective lateral edge than the second end and is in the range of 51% to 57% of the TW.

22. The tire according to claims 15, 17, 18, 19, 20, or 21 wherein the circumferential spacing between the leading edge of one primary lug and the leading edge of the next adjacent traction lug of the same set is within the range of 50% to 70% of the tread width; and that each lug is diagonally spaced apart from another lug a distance of at least 12% of the tread width.

23. The tire of claim 14 wherein each lug of the first and second sets of primary lugs extend from the respective lateral edge the tread to the axially inner end located an axial distance of between 25% to 45% of the tread width of the tire and having a leading and a trailing edge extending from the respective lateral edge to the axially inner end, the leading and trailing edges being parallel to one another and at an inclination with respect to the equatorial centerplane of the tire in the range of 45 degrees to 60 degrees over at least 65% of the overall length of the lug; and each lug of said first and second set of secondary lugs having the first end located an axial distance from the respective lateral edge between 19% to 29% of the tread width of the tire and having first and second portions, the first portion extending from the first end to an axially inner end of the first portion located between 35% to 45% of the tread width, the second portion extending from the said axially inner end of the first portion to another axially inner end located between 47% to 57% of the tread width of the tire, and the first and the second portions each having a leading and a trailing edge.

24. The tire of claim 23 wherein the leading and trailing edges of the first portion of the lugs of the first and second sets of secondary lugs are parallel for at least 65% of its length as measured along the leading edge of the first portion and the leading and trailing edges of the second portion of the lugs of the first and second sets of secondary lugs are parallel for at least 65% of its length as measured along the leading edge of the second portion.

25. The tire of claim 24 wherein: a centerline located midway between the parallel portion of the leading and trailing edges of the first portion of each lug of said first and second secondary sets of lugs forms an angle with a line parallel to the equatorial centerplane of the tire in the range of 45 degrees to 60 degrees; another centerline located midway between the parallel portion of the leading and trailing edges of the second portion of each lug of said first and second secondary sets of lugs forms an included angle with the centerline of the first portion in the range of 158 degrees to 168 degrees.

26. The tire of claim 24 wherein the leading and trailing edges of the lugs of the first and second sets of primary lugs are parallel to one another at least 75% of the overall length of said lug.

27. A pneumatic tire for use on tractor and the like vehicle drive wheels, the tire having an axis of rotation, an equatorial centerplane and a tread portion having a pair of lateral edges, the tread portion comprising:

(a) two sets of primary lugs, the first set of primary lugs being spaced circumferentially about the tread of the tire and extending from a first lateral edge of the tread, the second set of primary lugs being spaced circumferentially about the tread of the tire and extending from a second lateral edge of the tread, each of the second set of primary lugs being similar to the first set of primary lugs but opposite in hand, both first and second sets of primary lugs extending axially inwardly from a lateral edge a distance 25% to 45% of the tread width wherein every primary lug has a length taken along the line which contains the midpoint of the length of the axially outermost edge of the primary lug and the axially innermost point of the leading edge of the primary lug;

(b) first and second sets of secondary lugs, the lugs of the first set of secondary lugs being disposed circumferentially between the lugs of the first set of primary lugs, and each lug of the first set of secondary lugs being located axially inwardly of the first lateral edge a distance in the range of 19% to 32% of the tread width of the tread and extending to the equatorial centerplane, each lug of the second set of secondary lugs being located axially inwardly of the second lateral edge a distance in the range of 19% to 32% of the tread width of the tread and extending to the equatorial centerplane, the second lugs of the second set being similar to the secondary lugs of the first set but opposite in hand, the secondary lugs of both the first and second sets having a first portion including leading and trailing edges and a second portion including leading and trailing edges, the leading and trailing edges of both first and second portion being parallel over 65% of their respective lengths, the second portion being nearest to the equatorial centerplane and the first portion being adjacent to the second portion and extending axially outwardly toward the first lateral edge at an angle in the range of 45° to 60° relative to the equatorial centerplane as measured from a lug centerline located midway between the parallel leading end trailing edges of the first portion, wherein every secondary lug has a length taken along the line which contains the midpoint of the length of the axially outermost edge of the secondary lug and the axially innermost point of the leading edge of the secondary lug and the length of each secondary lug is at least 75% of the length of the primary lugs.

28. A pneumatic tire as in claim 27 wherein the angle of the first portion of the secondary lugs is in the range of 45° to 54°.

29. A pneumatic tire as in claim 27 wherein the centerline of the second portion of the secondary lug forms an included angle in the range of 158° to 168° with the centerline of the first portion, the centerline of the second portion being located midway between the leading and trailing edges.

30. A pneumatic tire as claimed in claim 27 wherein the axially inward end portion of each lug is enlarged in ground contacting area.

31. A pneumatic tire as in claim 27 wherein each lug of the first and second sets of primary lugs includes a first and a second portion, each portion having a leading edge, and a trailing edge, the first portion extending from one lateral edge of the tread toward the equatorial centerplane of the tire at an angle between 45° and 60° relative to the equatorial centerplane of the tread as measured from a lug centerplane located midway between the leading and trailing edges of the first portion, the second portion extending from the axially inner end of the first portion toward the equatorial centerplane, a centerline of the second portion forming an included angle in the range of 158° to 168° with the centerline of the first portion, the centerline of the second portion being located midway between the leading and trailing edges of the second portion.

32. A pneumatic tire as in claim 31 wherein the range of angles of the first portions of the secondary lugs are about equal to those of the first portions of the primary lugs and the range of angles of the second portions of the secondary lugs are about equal to those of the of the second portions of the primary lugs.

* * * * *